United States Patent
Yamanaka et al.

(10) Patent No.: US 7,212,324 B2
(45) Date of Patent: May 1, 2007

(54) OPTICAL SCANNING ARRANGEMENT AND IMAGE FORMING DEVICE WITH THE ARRANGEMENT

(75) Inventors: Toshio Yamanaka, Yao (JP); Ayumu Oda, Nara (JP); Norio Tomita, Yamatokoriyama (JP); Kyosuke Taka, Nara (JP); Hidekazu Sakagami, Kashihara (JP); Mitsuhiro Ohno, Saitama (JP); Tetsuya Ori, Saitama (JP)

(73) Assignees: Sharp Kabushiki Kaisha, Osaka (JP); Fujinon Corporation, Saitama (JP)

( * ) Notice: Subject to any disclaimer, the term of this patent is extended or adjusted under 35 U.S.C. 154(b) by 1056 days.

(21) Appl. No.: 10/297,194

(22) PCT Filed: Dec. 4, 2001

(86) PCT No.: PCT/JP01/10582

§ 371 (c)(1),
(2), (4) Date: Dec. 3, 2002

(87) PCT Pub. No.: WO02/46826

PCT Pub. Date: Jun. 13, 2002

(65) Prior Publication Data

US 2003/0133166 A1 Jul. 17, 2003

(51) Int. Cl.
*G02B 26/08* (2006.01)

(52) U.S. Cl. ............... 359/196; 359/212; 359/216; 359/208

(58) Field of Classification Search ................. None
See application file for complete search history.

(56) References Cited

U.S. PATENT DOCUMENTS 5,638,189 A * 6/1997 Yanagisawa ............... 358/481
6,271,869 B1 * 8/2001 Tada et al. ................. 347/116

FOREIGN PATENT DOCUMENTS

| JP | 57-104915 | 6/1982 |
|---|---|---|
| JP | 01-205119 | 8/1989 |
| JP | 06/235876 | 8/1994 |
| JP | 06-337362 | 12/1994 |
| JP | 2000-180747 | 6/2000 |
| JP | 2000-180748 | 6/2000 |
| JP | 2001-021823 | 1/2001 |
| JP | 2001-228427 | 8/2001 |
| JP | 2001-356259 | 12/2001 |

* cited by examiner

Primary Examiner—James Phan
(74) Attorney, Agent, or Firm—Renner, Otto, Boisselle & Sklar, LLP

(57) ABSTRACT

The present invention includes a first plate (14) and a second plate (15) which perform a coarse adjustment of a cylinder mirror (245) by moving the cylinder mirror (245) linearly in the substantially vertical and parallel directions with respect to an appropriate plane surface of a reflective surface (RS) of the cylinder mirror (245), and the second plate (15), a second plate opening section (15*b*), a setscrew (24), and a hexagon shaft (25) which perform a fine adjustment in the position of the cylinder mirror (245) by moving linearly only in the substantially parallel direction after the coarse adjustment has been completed.

14 Claims, 7 Drawing Sheets

OPTICAL SCANNING ARRANGEMENT AND IMAGE FORMING DEVICE WITH THE ARRANGEMENT

TECHNICAL FIELDS

The present invention relates to an optical scanning arrangement used in an image forming device such as printer, copying machine, and facsimile apparatus which scans and records images on photoconductors in accordance with scanning beams made from optical beams which are modulated based on image data, and the image forming device including the optical scanning arrangement. More particularly, the present invention relates to adjustment means for adjusting scanning positions of scanning beams.

BACKGROUND OF THE INVENTION

In an image forming device, e.g. digital copying machine, optical printer, etc., with optical scanning and recording in a conventional electrophotographic system, used is an optical scanning arrangement in which an image carrier such as a photoconductor drum and an optical scanning unit such as an LSU (Laser Scanning Unit) and an LED (Light Emitting Diode) line head are positioned mutually in a predetermined positional relation in a frame of a main body. Also, with optical beams modulated in accordance with image data in the optical scanning unit, the image carrier surface is scanned and exposed so that images are recorded and reproduced.

In such an optical scanning arrangement, a positional relation between the image carrier and the optical scanning unit affects image quality of images to be recorded and reproduced.

Consequently, in order to adjust the mutual positional relation between the image carrier and the optical scanning unit, adopted are a method of adjusting a position for installing the optical scanning unit itself or a method of adjusting a reflection mirror positioned just in front of a scanning target such as the photoconductor drum.

Further, in case of a plurality of scanning beams, adjustment in the positional relation between the scanning target and the optical scanning unit can be arranged by a method of mounting the optical scanning unit in a case including the scanning target after adjusting a position for mounting the optical scanning unit so that the plurality of scanning beams run in parallel. Alternatively, adjustment for each optical scanning unit can be arranged in installing each optical scanning unit in the case.

The above methods have been devised to adjust a deviation of the positional relation between the scanning target and the optical scanning unit for the purpose of obtaining an excellent image quality.

Incidentally, as to a color image forming device, a so-called image forming device in tandem system, utilizing a plurality of image carries and optical scanning units having the number corresponding to the number of the image carriers, has been developed in recent years in order to increase a speed of color image formation. In the image forming device in tandem system (hereinafter referred to as "tandem apparatus"), optical scanning units have been arranged separately, and adjustment in mutual positions between the image carriers and the optical scanning units has been carried out by a method of adjusting a position for mounting the optical scanning unit.

However, in the conventional optical scanning arrangement, the optical scanning units are adjusted by each unit, resulting in a subtle deviation occurred between the optical scanning units and the scanning target after installing them in a main apparatus. Although this deviation can be adjusted by adjustment in the position of the reflection mirror as described above, it is necessary to move the reflection mirror and its supporting member together. Therefore, it is necessary to adjust the position of the mirror not only in a wide area but also in multi-directions. Because of this, there is a problem of difficulty in fine adjustment.

Further, in case of the tandem apparatus which has the plurality of optical scanning units, there has been a problem of a high cost. Therefore, considered has been an optical scanning arrangement in a system in which optical deflecting means for scanning with beam are shared, and a single optical deflecting means scan with a plurality of scanning beams.

Thus, in the optical scanning arrangement in such a system that the single optical deflecting means scans with the plurality of scanning beams, an optical scanning unit has one-unit-structure. Therefore, in the previous method of adjusting the positions for mounting the optical scanning units for positional deviations of the image carriers, it is impossible to perform the positional adjustment of each optical scanning line corresponding to each image carrier. More specifically, only a method of adjusting the position of the mirror disposed in a light path between the optical deflecting means and each image carrier can adjust the positional deviation.

Therefore, in order to adjust the positional deviation which occurs after the optical scanning arrangement has been installed to the main apparatus, the movement of the mirror position is required. Also, in the method of adjusting by moving the mirror position, desired are the movement of the mirror position only in a certain direction and a small influence on images with the movement of the mirror position; especially, the influence on scanning properties is desired as small as possible.

DISCLOSURE OF THE INVENTION

An object of the present invention is to provide an optical scanning arrangement which can minimize the influence on scanning properties and adjust a scanning position of a scanning beam easily and quickly after installing the optical scanning arrangement in an image forming device, and the image forming device using the optical scanning arrangement.

In order to achieve the foregoing object, an optical scanning arrangement of the present invention includes adjustment means for adjusting a scanning position of a scanning beam from optical scanning means, the adjustment means adjusting a position of a curved mirror for reflecting the scanning beam and guiding the scanning beam thus reflected to a scanning target, so as to adjust the scanning position of the scanning beam, and including first adjustment means for carrying out coarse adjustment in the position of the curved mirror and second adjustment means for carrying out fine adjustment in the position of the curved mirror, the first adjustment means moving the curved mirror linearly in substantially vertical and parallel directions with respect to an approximately plane surface of a part where the scanning beam can be incident in a reflective surface of the curved mirror, so as to carry out the coarse adjustment in the position of the curved mirror, the second adjustment means moving the curved mirror linearly only in a substantially parallel direction with respect to the approximately plane surface after the first adjustment means have completed the coarse adjustment, so as to carry out the fine adjustment in the position of the curved mirror.

Here, as a method of adjusting a mirror position considered are various methods for movement, such as a method of rotating a mirror body in a plane surface which is vertical to a reflective surface of the mirror, a method of making the mirror body to advance and retreat in the direction of incident light or reflected light, a method of moving the mirror body in the parallel direction to its reflective surface, or a method of moving the mirror body in the vertical direction to its reflective surface.

Inventors of the present invention have focused special attention on the method of moving the mirror body in the vertical direction to its reflective surface and the method of moving the mirror body in the parallel direction to its reflective surface and studied the influence on the scanning properties of the scanning beam with the movement of the mirror position.

As a result of extensive research, it has been proved that correction of the scanning tilt is possible by the above two methods; however, the method of moving in the parallel direction have a smaller influence on the scanning properties of the scanning beam than that of moving in the vertical direction.

Consequently, in view of the necessities of moving the mirror position only in a certain direction and minimizing the influence on images with the movement of the mirror position, a method of moving the mirror position in the parallel direction to adjust the mirror position is preferable in the adjustment performed after the optical scanning unit is installed in the main apparatus.

In the present invention, before the optical scanning arrangement is installed in the image forming device, the first adjustment means cause the position of the curved mirror to be moved linearly in the substantially vertical and parallel directions to the approximately plane surface, whereby the scanning position of the scanning beam reflected by the curved mirror moves on the scanning target. After the optical scanning arrangement is installed in the image forming device, the second adjustment means cause the position of the curved mirror to be moved linearly in the substantially parallel direction to the approximately plane surface, whereby the scanning position of the scanning beam reflected by the curved mirror moves on the scanning target.

Therefore, before the optical scanning arrangement is installed, the first adjustment means can adjust the position of the curved mirror while checking the position of the scanning beam on the scanning target, so that the coarse adjustment of the position of the scanning beam is possible to obtain an excellent image quality. Further, by installing the optical scanning arrangement in the image forming device, the second adjustment means cause the position of the curved mirror to be moved, whereby the fine adjustment can be performed for the positional deviation of the scanning beam caused on the scanning target.

Especially, the movement direction of the position of the curved mirror by the second adjustment means is the substantially parallel direction to the approximately plane surface of the reflective plane surface of the curved mirror, so that it is possible to minimize the scanning beam's influence on scanning properties and adjust the positional deviation of the scanning beam. Further, in the adjustment by the second adjustment means, the movement in the substantially parallel direction alone can adjust the position of the curved mirror, so that it is not necessary to make the curved mirror move in multi-directions, and easy adjustment is possible.

As a result of this, it is possible to provide an optical scanning arrangement which can minimize the influence on scanning properties and adjust the scanning position of the scanning beam easily and quickly after installing the optical scanning arrangement in the image forming device.

Additional objects, features, and strengths of the present invention will be made clear by the description below. Further, the advantages of the present invention will be evident from the following explanation in reference to the drawings.

BEST MODE FOR CARRYING OUT THE INVENTION

The following will explain one embodiment of the present invention with reference to FIGS. 1 through 7. Note that, the present invention is not limited to this. Moreover, as an image forming device in the present embodiment, for example, a digital color copying machine in tandem system is described. Incidentally, the image forming device is not necessarily limited to this, and a printer, other copying machine, or a facsimile apparatus may be adopted. Further, in the present embodiment, as the digital color copying machine in tandem system described is a system in which one optical deflecting section scans with a plurality of light beams. However, the digital color copying machine in tandem system is not limited to this, and a system in which a plurality of image carriers and optical scanning units having the number corresponding to the number of the image carriers may be adopted.

Further, the explanation is carried out in accordance with the order of (1) the whole arrangement of the image forming device, (2) the consideration of the method for adjusting scanning positions of laser beams, and (3) the adjustment mechanism of the cylinder mirror.

(1) The Whole Arrangement of the Image Forming Device

Figure 2:
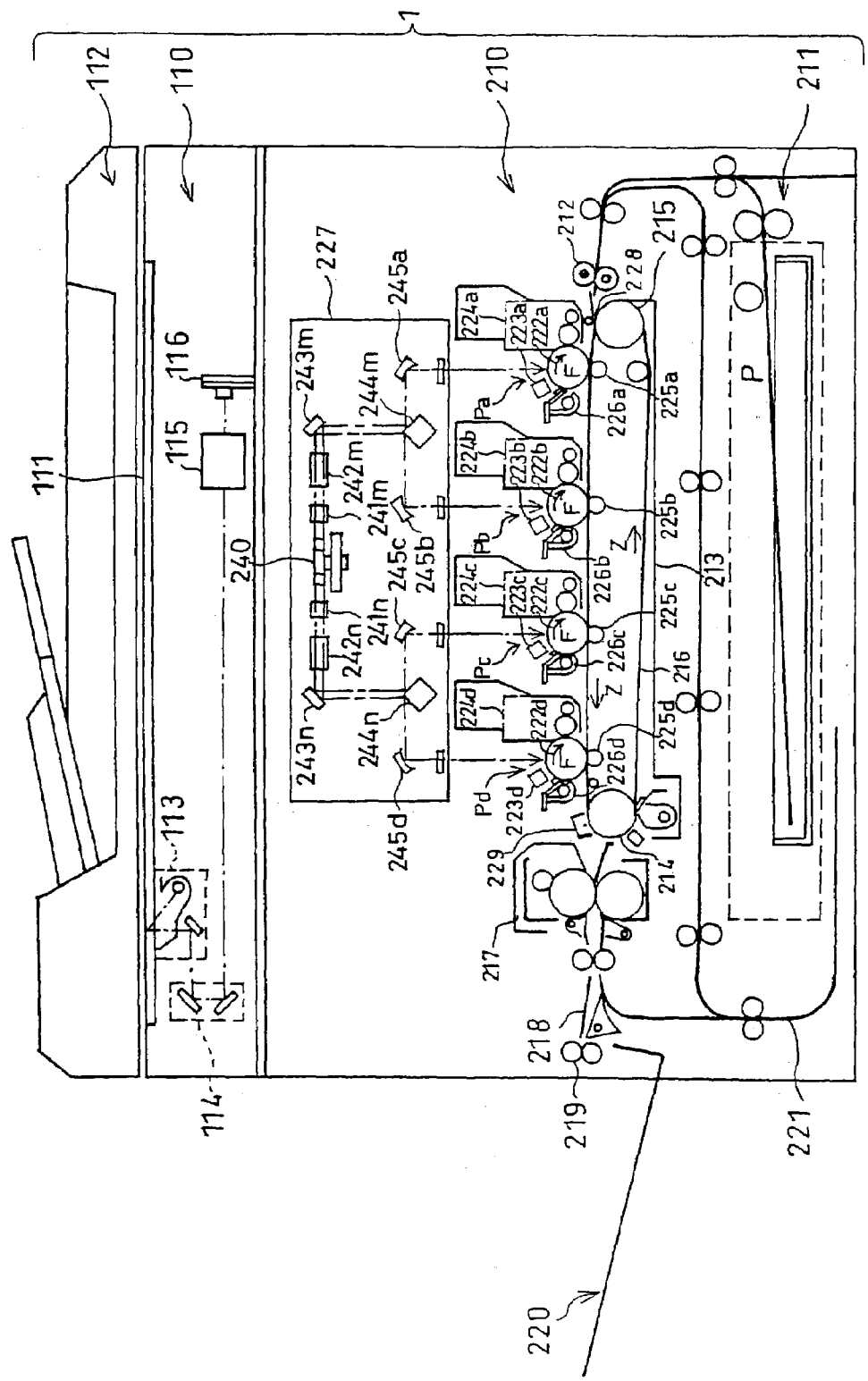
FIG. 2 is a block diagram schematically showing a digital color copying machine utilizing the optical scanning arrangement.

In the digital color copying machine as an image forming device of the present embodiment as shown in FIG. 2, a copying machine body 1 is provided with a document board 111 and a control panel not shown at the upper part thereof, and an image reading section 110 and an image forming section 210 inside thereof. On the upper surface of the document board 111, an RADF (Recirculating Automatic Document Feeder) 112 is supported in an openable and closable state by the document board 111. Also, the RADF 112 is fixed to the upper surface of the document board 111 in a predetermined positional relation.

Further, first, the RADF 112 feeds a document such that one side of the document opposes the image reading section 110 at a predetermined position of the document board 111. Upon completing the image reading of one side of the document, the document is reversed such that the other side of the document opposes the image reading section 110 at a predetermined position of the document board 111. Then, the document is fed toward the document board 111. Further, upon completing the image reading of two sides of one document, the RADF 112 ejects the document and performs two-sides feeding operation of the subsequent document.

The document feeding and reversing operation is controlled in relation to the operation of the whole copying machine.

The image reading section 110 is arranged below the document board 111 so as to read images of documents fed onto the document board 111 by the RADF 112. The image reading section 110 includes a document scanning element which moves back and forth in parallel to the bottom surface of the document board 111, an optical lens 115, and a CCD (Charge Coupled Device) line sensor 116 as a photo-electric converter.

The document scanning element is composed of a first scanning unit 113 and a second scanning unit 114. The first scanning unit 113 includes an exposure lump which exposes an image surface of a document and a first mirror which deflects a reflected light image from the document toward a predetermined direction. Moreover, the first scanning unit 113 moves back and forth in parallel to the bottom surface of the document board 111 at a certain distance from each other and at a predetermined scanning speed.

The second scanning unit 114 includes second and third mirrors each of which further deflects the reflected light image from the document, which has been deflected by the first mirror of the first scanning unit 113, toward a predetermined direction. Moreover, the second scanning unit 114 moves back and forth in parallel, maintaining a certain speed relation with the first scanning unit 113.

The optical lens 115 demagnifies the reflected light image from the document which has been deflected by the third mirror of the second scanning unit 114, and focuses the light image thus demagnified at the predetermined position on the CCD line sensor 116.

The CCD line sensor 116 sequentially subjects the light image thus focused to photoelectric transfer to output as an electrical signal. The CCD line sensor 116 is three-lines-color CCD which can read monochrome images or color images and color-decompose them to color elements: R (red), G (green), and B (blue) to output as line data. Document image information that has been converted into electrical signals by the CCD line sensor 116 is further forwarded to an image processing section not shown to be given a predetermined image data processing.

Next, the following will explain the arrangement of the image forming section 210 and the arrangements of sections included in the image forming section 210.

At the bottom of the image forming section 210 provided is a feeder 211 which separates one by one papers P as a recording medium carried and stored inside a paper tray to supply toward the image forming section 210. Then, at the timings controlled by a pair of resist rollers 212 disposed at the forward of the image forming section 210, papers P, which has been separated and supplied one by one, are fed to the image forming section 210. Further, the papers P having images formed on their one side are supplied and fed again to the image forming section 210 in accordance with the timings of image forming by the image forming section 210.

At the bottom of the image forming section 210 arranged is a transfer feeding belt mechanism 213. The transfer feeding belt mechanism 213 make the papers P adsorbed with static electricity to feed to a transfer feeding belt 216 which lays across in a tensioned condition so as to extend substantially in parallel between a drive roller 214 and a driven roller 215.

Further, on the downstream side of the transfer feeding belt mechanism 213 in a feeding path for papers arranged is a fuser device 217 for fusing toner images that has been transferred on the papers P, onto the papers P. The papers P passes through a nip section between a pair of fuser rollers in the fuser device 217 and ejected by a ejecting roller 219 via a switching gate for feeding directions 218 onto a paper feed tray 220 which is attached to the outer wall of the copying machine body 1.

The switching gate 218 selectively switches a feeding path for the papers P after toner fusing, between a path for ejecting the papers P to the copying machine body 1 and a path for re-supplying the papers P toward the image forming section 210. The papers P of which the feeding direction is switched toward the image forming section 210 by the switching gate 218 are supplied again to the image forming section 210 after being reversed via a switch-back feeding path 221.

Further, above the transfer feeding belt 216 in the image forming section 210, a first image forming station Pa, a second image forming station Pb, a third image forming station Pc, and a fourth image forming station Pd are arranged, close to the transfer feeding belt 216, so as to align in a line orderly from the upstream side of the feeding path for papers.

The transfer feeding belt 216 is subjected to friction drive by the drive roller 214 in the direction indicated by an arrow Z in FIG. 2, as well as holds the papers P supplied via the feeder 211 as described previously and sequentially feeds the papers P to the image forming stations Pa to Pd.

Each of the image forming stations Pa to Pd has a substantially identical arrangement. The image forming stations Pa, Pb, Pc, and Pd includes respectively photoconductor drums 222a, 222b, 222c, and 222d as scanning targets, subjected to rotational drive in the direction indicated by an arrow F in FIG. 2.

On the periphery of the photoconductor drums 222a, 222b, 222c, and 222d respectively provided are charging devices 223a, 223b, 223c, and 223d which charges uniformly on the photoconductor drums 222a, 222b, 222c, and 222d; development devices 224a, 224b, 224c, and 224d which respectively develop electrostatic latent images formed on the photoconductor drums 222a, 222b, 222c, and 222d; discharge devices for transfer 225a, 225b, 225c, and 225d which transfer onto the papers P toner images thus developed on the photoconductor drums 222a, 222b, 222c, and 222d; and cleaning devices 226a, 226b, 226c, and 226d which remove residual toners remaining on the photoconductor drums 222a, 222b, 222c, and 222d, all of which are sequentially disposed along the rotational directions of the photoconductor drums 222a, 222b, 222c, and 222d.

Moreover, above the photoconductor drums 222a, 222b, 222c, and 222d provided is a laser beam scanner unit 227. The laser beam scanner unit 227 is composed of a semiconductor laser element not shown as optical scanning means for emitting dot lights modulated in accordance with image data, a polygon mirror 240 as optical deflecting means for deflecting a laser beam emitted from the semiconductor laser element in the main-scan direction, fθ lens 241*m*, 241*n*, 242*m*, 242*n* for focusing the laser beam thus deflected by the polygon mirror 240 onto the surfaces of the photoconductor drums 222*a*, 222*b*, 222*c*, and 222*d*, reflection mirrors 243*m*, 243*n*, 244*m*, and 244*n*, cylinder mirrors 245*a*, 245*b*, 245*c*, 245*d* as a curved mirror, and others.

The polygon mirror 240 deflects pairs of laser beams, which are emitted from plural semiconductor laser elements not shown, in opposite directions. The pairs of laser beams deflected in the respective directions by the polygon mirror 240 pass through the fθ lens 241*m*, 242*m* and the fθ lens 241*n*, 242*n*, respectively, and further reflected by the reflection mirrors 243*m* and 243*n*. The reflection mirrors 244*m* and 244*n* are prism mirrors, which further reflect the respective pairs of laser beams in opposite directions, thereby dividing all of the laser beams. The beams thus divided by the reflection mirrors 244*m* and 244*n* are focused on the surfaces of the photoconductor drums 222*a*, 222*b*, 222*c*, and 222*d* by the cylinder mirrors 245*a*, 245*b*, 245*c*, 245*d*, respectively.

To the laser beam scanner unit 227 inputted are pixel signal corresponding to black-colored component image, pixel signal corresponding to cyan-colored component image, pixel signal corresponding to magenta-colored component image, and pixel signal corresponding to yellow-colored component image in color document images.

Electrostatic latent images corresponding to document image information subjected to color conversion in accordance with this are formed on the photoconductor drums 222*a* to 222*d*. A black-colored toner, a cyan-colored toner, a magenta-colored toner, and a yellow-colored toner are stored in developing devices 224*a*, 224*b*, 224*c*, and 224*d*, respectively. The electrostatic latent images on the photoconductor drums 222*a* to 222*d* are developed by toners of these colors. This allows the document image information subjected to color conversion in the image forming section 210 is reproduced as toner images of each color.

Further, between the first image forming station Pa and the feeder 211 provided is a paper absorption charge device 228 for, e.g. a brush, and others. The absorption charge device 228 charges the surface of the transfer feeding belt 216 to make a condition in which the papers P supplied from the feeder 211 are reliably absorbed onto the transfer feeding belt 216. Consequently, without deviation, the papers P are fed a distance between the first image forming station Pa and the fourth image forming station Pd.

Meanwhile, substantially directly above the drive roller 214 disposed between the fourth image station Pd and the fuser device 217 provided is an ionizer 229. To the ionizer 229 applied is an alternating current for separating the papers P absorbed with static electricity to the feeding belt 216 from the transfer feeding belt 216.

In the copying machine body 1 arranged as described above, single-cut sheets of papers are used as the papers P. The papers P are fed from a paper feed cassette and supplied to inside of a guide of the feeding path for papers in the feeder 211. The front edge parts of the supplied papers P are sensed by a sensor not shown, and the supply of the papers P is temporarily stopped by the pair of resist rollers 212 in accordance with detecting signals outputted from the sensor.

Then, the paper P is fed onto the transfer feeding belt 216 rotating in the direction of the arrow Z shown in FIG. 2, adjusting its timing with the image stations Pa to Pd. At this moment, as described above, predetermined charges are provided to the transfer feeding belt 216 by the absorption charge device 228, so that the papers P are stably fed and supplied during the passage from the image stations Pa to Pd. In the image stations Pa to Pd, the formed toner images of the respective colors are superimposed onto a supporting surface of the paper P which are absorbed with static electricity and fed by the transfer feeding belt 216. Upon completion of image transfer by the fourth image station Pd, the paper P is peeled off from the transfer feeding belt 216 by the ionizer 229, sequentially beginning from the front edge part of the paper P, and the paper P is guided to the fuser device 217. Finally, the paper P on which the toner image is fused is ejected from paper ejection port not shown onto the paper feed tray 220.

(2) The Consideration of the Method for Adjusting Scanning Positions of Laser Beams Next, the following will explain what adjustment method should be adopted to adjust the scanning positions of laser beams as scanning beam for scanning and exposing the photoconductor drums 222*a* to 222*d*. Note that, the method for adjusting the scanning positions of laser beams described as follows is a method for adjusting a tilt of the laser beam in the scanning direction of the laser beam with respect to the centerline direction of the photoconductor drums 222*a* to 222*d*.

In the laser beam scanner unit 227 as arranged above in which a single polygon mirror 240 causes scanning with a plurality of laser beams, a position of a mirror provided between the polygon mirror 240 and the photoconductor drums 222*a* to 222*d* is adjusted in order to adjust the scanning positions of the laser beams. In the digital color copying machine as arranged above, the cylinder mirror 245*a*, 245*b*, 245*c*, and 245*d* as curved mirrors are provided for post-division laser beams. Consequently, adjustment of laser beams' scanning position can be made by adjusting the positions of the cylinder mirror 245*a*, 245*b*, 245*c*, and 245*d*.

The following will explain a method for adjusting the positions of the cylinder mirror 245*a*, 245*b*, 245*c*, and 245*d*. Note that, when using without distinction, each of the cylinder mirror 245*a*, 245*b*, 245*c*, and 245*d* are referred to as a cylinder mirror 245 in the following explanation. According to this, a photoconductor drum 222, and others are also referred.

First, in order to adjust the tilt of the laser beam's scanning direction by adjustment of the position of the cylinder mirror 245, it is preferable that the cylinder mirror 245 shown in FIG. 2 is moved in the linear direction. The linear movement can be realized by a mechanism with a relatively simple arrangement for the movement and enables highly accurate movement even in the mechanism with a simple arrangement. In the present embodiment, the cylinder mirror 245 is therefore defined to be moved linearly.

Figure 3:
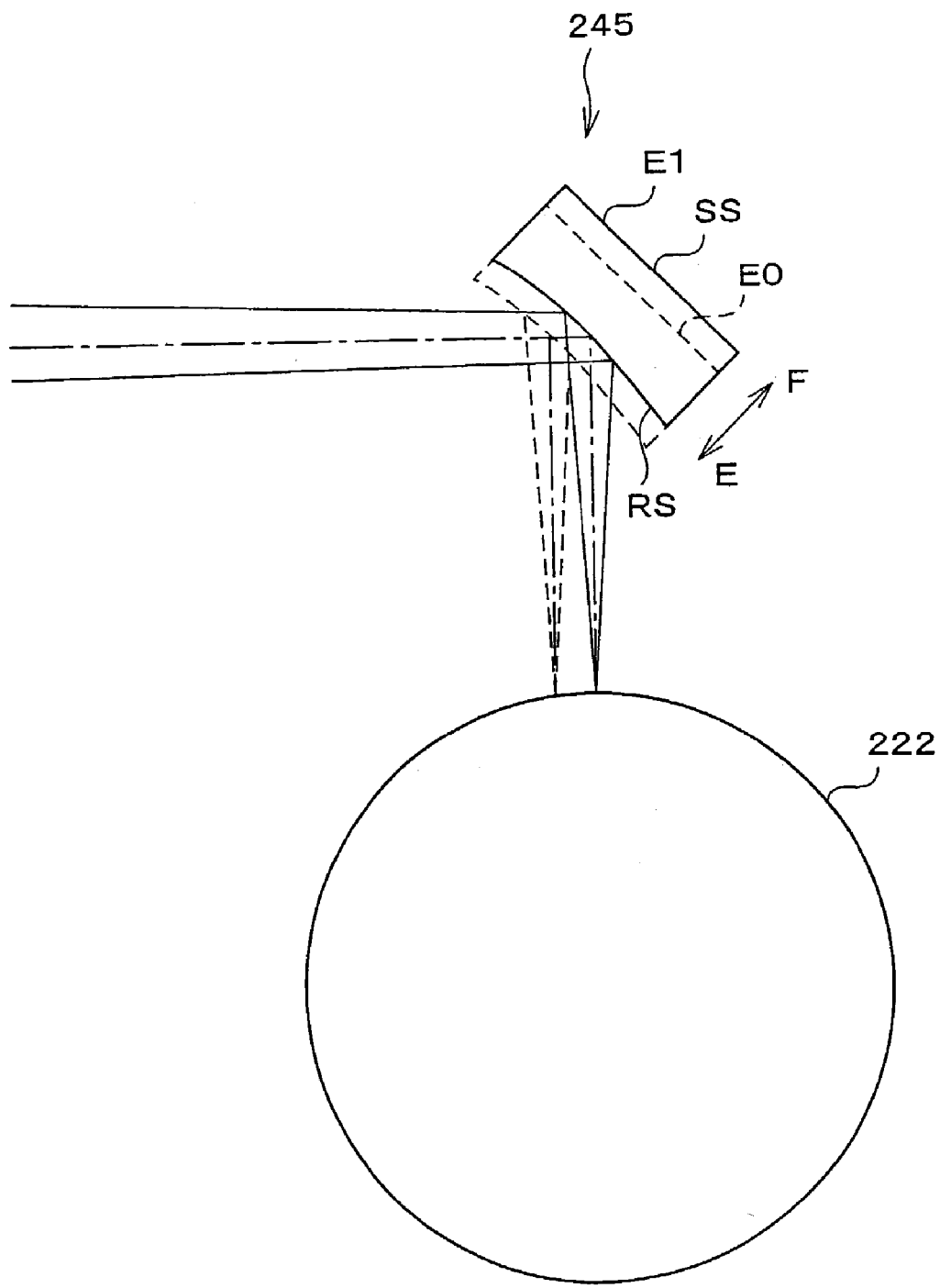
FIG. 3 is a schematic diagram showing a state in which adjustment is performed by moving a cylinder mirror in the digital color copying machine in the vertical direction.
Figure 4:
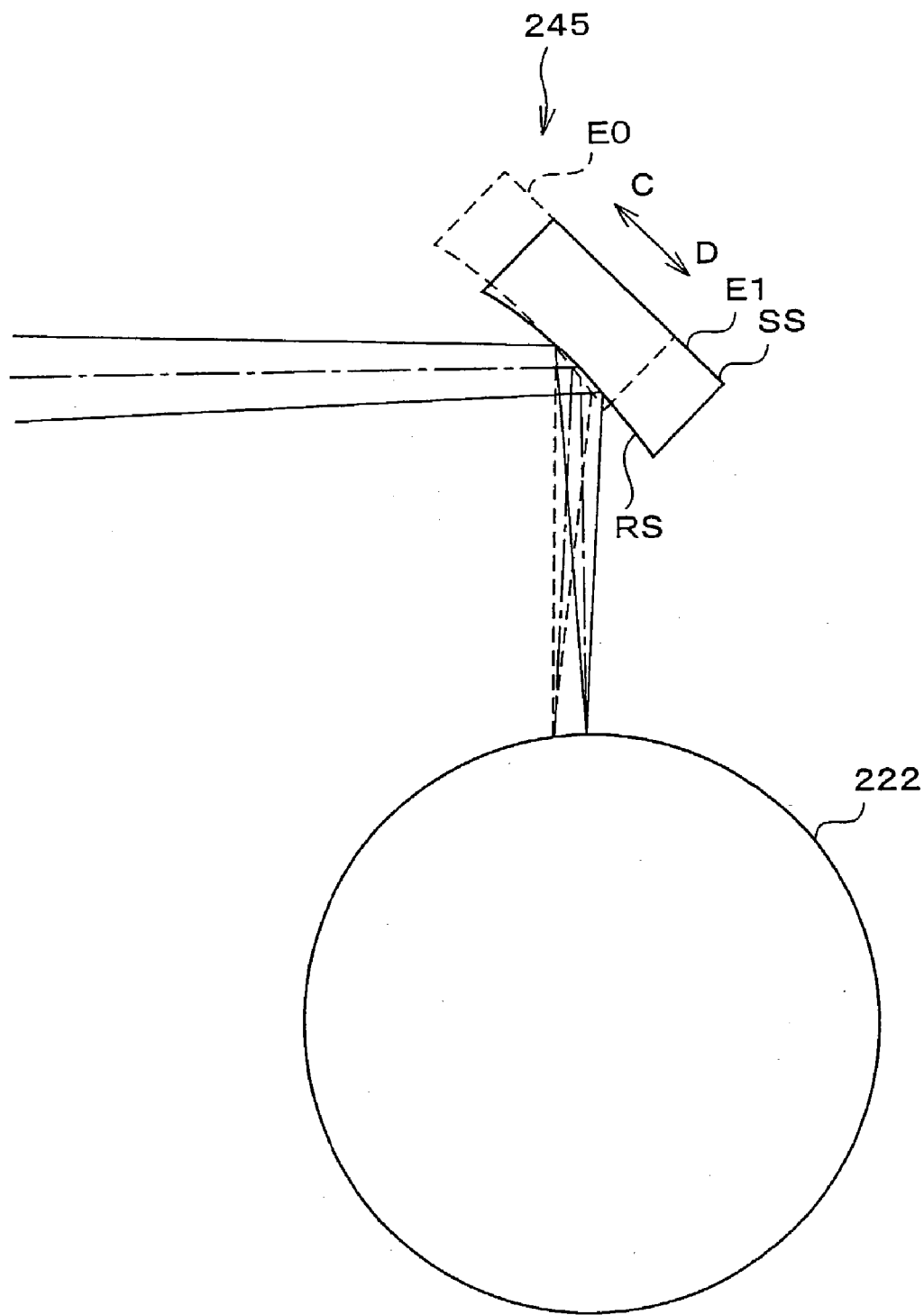
FIG. 4 is a schematic diagram showing a state in which adjustment is performed by moving a cylinder mirror in the digital color copying machine in the parallel direction.

Here, as a method for linearly moving the cylinder mirror 245 considered are, for example, a method of linearly moving the cylinder mirror 245 in the vertical direction to a reflective surface RS as shown in FIG. 3, and a method of linearly moving the cylinder mirror 245 in the parallel direction to the reflective surface RS as shown in FIG. 4. Note that, in FIGS. 3 and 4, a mirror movement start position EO, i.e. an initial position of the cylinder mirror 245's movement is indicated by a broken line and a position of a mirror movement end face El is indicated by a full line. Further, the reflective surface RS of the cylinder mirror 245 is a curved surface. Therefore, the vertical direction and the parallel direction as described above are the directions with respect to an approximate plane surface (hereinafter referred to as "approximate surface"), which is approximated by the reflective surface RS of the cylinder mirror 245 in an area where the laser beam is actually irradiated when the adjustment is carried out. Further, the adjustment in the vertical direction shown in FIG. 3 is referred to as "vertical adjustment", and the adjustment in the parallel direction shown in FIG. 4 is referred to as "parallel adjustment."

Next, as to the cases of the vertical adjustment and the parallel adjustment, the examination results of change in scanning properties are shown in Table 1.

TABLE 1

Movement Direction of Cylinder Mirror and Change in Scanning Properties

| Direction of Movement | Scanning Tilt | Linearity | Scanning Line's Linearity |
|---|---|---|---|
| Parallel Direction | ○ | — | — |
| Vertical Direction | ○ | X | — |

Notes:
(1)
○: Being adjustable
X: Presence of change
—: No change
(2)
"Direction of Movement" is a direction with respect to a mirror reflective surface In examining the change in scanning properties, examined were a linearity and a scanning linearity in case when the vertical adjustment and the parallel adjustment were performed from a state where the a predetermined tilt had occurred, and a scanning tilt was corrected. Note that, the linearity indicates printing position accuracy in laser beams' movement in a main-scan direction on the photoconductor drum 222, i.e. constant pitch printing position accuracy.

The laser beam scanner unit 227 translates constant angular velocity motion of a laser beam into uniform motion by an fθ optical system. However, a perfect translation performed at a 100% chance is impossible, and a main-scan printing pitch aberration, i.e. linearity deviation occurs.

In case of the tandem copying machine, it is necessary that four colors have completely identical linearity deviations for preventing the occurrence of color shift.

Further, the scanning line's linearity indicates the linearity in the movement locus of the laser beam on the photoconductor drum 222.

As seen from Table 1, correction of scanning tilt was possible in both vertical and parallel adjustments. Also, there was no change in the scanning beam's linearity, and the scanning beam's linearity was maintained in both vertical and parallel adjustments. However, as to the linearity, the linearity was maintained in the parallel adjustment, but changed in the vertical adjustment. Therefore, it was proved that the parallel adjustment is more preferable than the vertical adjustment for adjusting the tilt in the laser beam scanning direction with respect to the centerline direction of the photoconductor drum 222.

(3) The Adjustment Mechanism of the Cylinder Mirror

Figure 1:
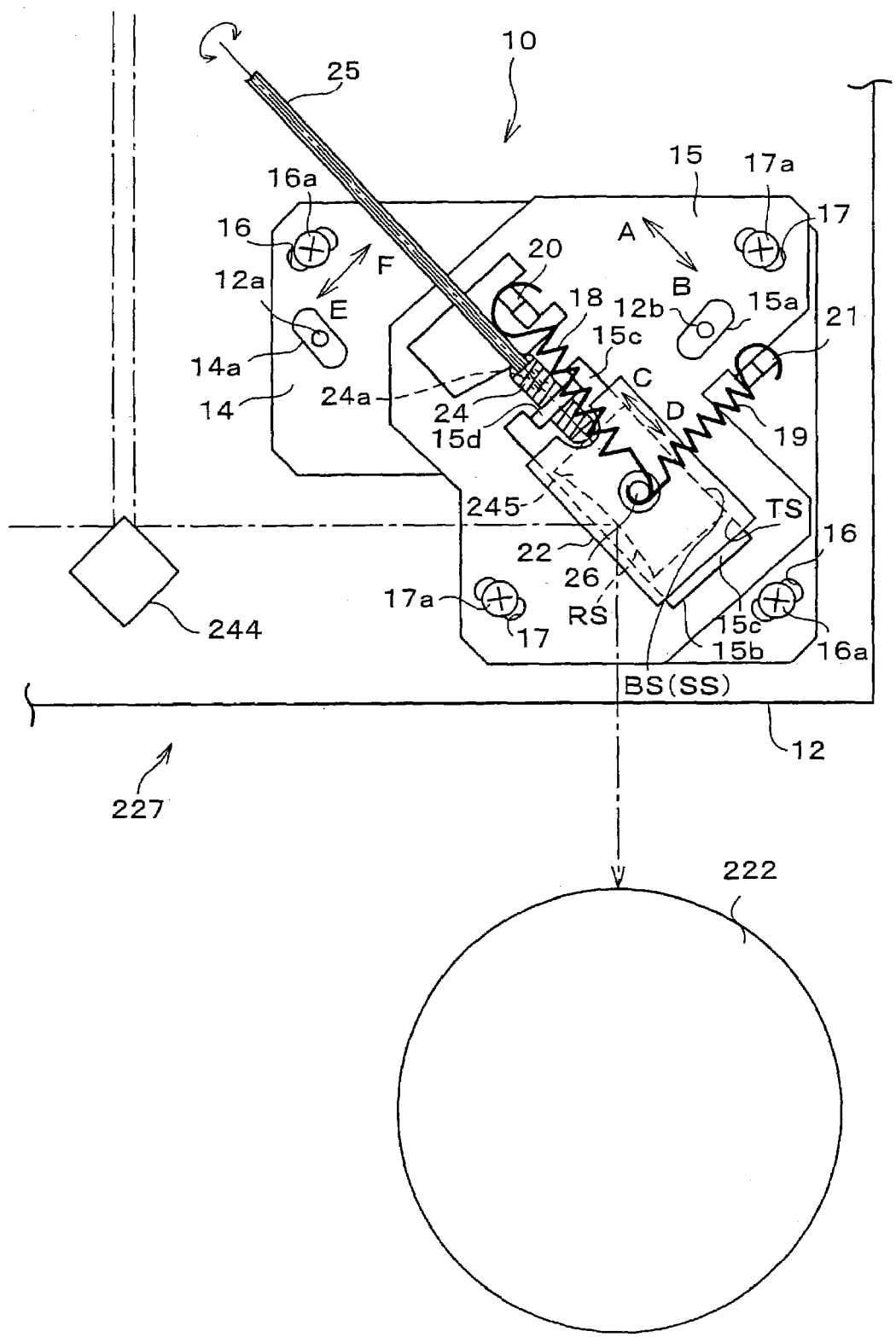
FIG. 1 is a block diagram showing one embodiment of an optical scanning arrangement in the present invention.

Next, referring to FIGS. 1 and 2, and FIGS. 5 through 7, the following will explain the adjustment mechanism of the cylinder mirror in the present embodiment, based on the above results. Note that, in the present embodiment, it is designed that coarse adjustment is carried out by first adjustment means before the laser beam scanner unit 227 is installed in the digital color copying machine, and then, fine adjustment can be carried out by second adjustment means after the laser beam scanner unit 227 is installed in the digital color copying machine. More specifically, as shown in FIG. 1, a cylinder mirror adjustment section 10 as adjustment means in the present embodiment is supported by a frame 12 of the laser beam scanner unit 227 as an optical scanning arrangement fixed to the main body of the digital color copying machine.

The cylinder mirror adjustment section 10 includes a first plate 14, a second plate 15, first plate guide holes 16•16 provided on the first plate 14, second plate guide holes 17•17 provided on the second plate 15, a first spring 18 and a second spring 19, a mirror cap 22, a setscrew 24, and a hexagon shaft 25.

The first plate 14, the second plate 15, the first plate guide holes 16•16 provided on the first plate 14, and the second plate guide holes 17•17 provided on the second plate 15 have a function as the first adjustment means of the present invention. Meanwhile, a second plate opening section 15b provided on the second plate 15, described later, the setscrew 24, and the hexagon shaft 25, have a function as the second adjustment means of the present invention.

The following will specifically explain the first adjustment means, and the second adjustment means will be specifically explained later.

Each of the first plate 14 and the second plate 15 making up the first adjustment means is a plate body and has an arrangement in which the second plate 15 with a smaller area than that of the first plate 14 overlaps beside the first plate 14 with a large area.

On the first plate 14, the first plate guide holes 16•16 are respectively provided on end parts opposite in the parallel direction with respect to the reflective surface RS, indicated as a direction of an arrow A-B in FIG. 1 (hereinafter simply referred to as "parallel direction"). The first plate guide holes 16•16 are provided so as to be long holes and provided in parallel to the vertical direction with respect to the reflective surface RS, indicated as a direction of an arrow E-F in FIG. 1 (hereinafter simply referred to as "vertical direction"). To the first plate guide holes 16•16, fixing screws 16a•16a are designed to be provided, and the fixing screws 16a•16a piercing the first plate guide holes 16•16 are screwed into the frame 12 so that the first plate 14 can be clamped and fixed.

With this arrangement, the first plate guide holes 16•16 are caused to move along the fixing screws 16a•16a, whereby the first plate 14 can be moved in the vertical direction with respect to the flame 12 for positional adjustment. After the completion of the adjustment in the vertical direction, the first plate 14 can be fixed to the frame 12 with the fixing screws 16a•16a.

Here, an adjustment hole 14a, which is a long hole in parallel to the direction of the arrow A-B, is provided on the first plate 14, and a circular hole 12a, which is a hole smaller than the adjustment hole 14a, is provided at the position of the flame 12 adjoining the adjustment hole 14a.

Therefore, when the first plate 14 is moved in the vertical direction, adjustment can be made by inserting in the adjustment hole 14a, using, for example, a tool designed for a plate position adjustment not shown, including a pillar section with a decentering periphery and a tip part for fitting to the circular hole 12a. More specifically, for adjusting the position of the first plate 14 by the tool designed for a plate position adjustment, its tip part is fitted to the circular hole 12a to be rotated. With this arrangement, the pillar section of the tool designed for a plate position adjustment rotates about the tip section as an axis, thereby rotating and moving the adjustment hole 14a. With the rotation of the adjustment hole 14a, the first plate 14 moves linearly in the right angle direction. Therefore, even after the first plate 14 is fixed to the frame 12 with the fixing screw 16a, it is possible to slightly move the position of the first plate 14 in the right angle direction by little releasing the fixing screw 16*a*.

Meanwhile, on the second plate 15, similarly, the second plate guide holes 17•17 are respectively provided at opposite end parts in the parallel direction. To the second plate guide holes 17•17, fixing screws 17*a*•17*a* are provided, and the fixing screws 17*a*•17*a* piercing the second plate guide holes 17•17 are screwed into the frame 12 so that the second plate 15 can be clamped and fixed.

The second plate guide holes 17•17 are provided as long holes in the direction of the parallel adjustment. Therefore, for a position adjustment it is possible to move the second plate 15 in the parallel direction with respect to the frame 12 by moving the second plate guide holes 17•17 along the fixing screws 17*a*•17*a*. Further, after the adjustment in the parallel direction, the second plate 15 can be fixed to the frame 12 with the fixing screws 17*a*•17*a*.

For adjusting the second plate 15 by the tool designed for a plate position adjustment, the adjustment hole 15*a*, which is a long hole in the right angle direction, is provided on the second plate 15. Further, a circular hole 12*b*, which is a hole smaller than the adjustment hole 15*a*, is similarly provided at the corresponding position of the first plate 14 under the adjustment hole 15*a*.

Consequently, by using the tool designed for a plate position adjustment, its tip part is fitted to the circular hole 12*b*, and the adjustment hole 15*a* is rotated and moved, thereby linearly moving the second plate 15 in the parallel direction. Therefore, even after the second plate 15 is fixed to the frame 12 with the fixing screw 17*a*, it is possible to slightly move the position of the second plate 15 in the parallel direction by little releasing the fixing screw 17*a*.

Note that, the adjustment of the first plate 14 in the vertical direction and the adjustment of the second plate 15 in the parallel direction are coarse adjustment performed before setting the laser beam scanner unit 227 in the digital color copying machine. In the coarse adjustment, it is possible to perform the vertical adjustment and the parallel adjustment by moving the cylinder mirror 245 with the first plate 14 and the second plate 15, while checking the condition and the position of the focus spot of the laser beam. At this moment, the adjustment is preferably performed in the state where the cylinder mirror 245 is disposed substantially at the center of the later-described second plate opening section 15*b*. With this arrangement, in the positional adjustment with the photoconductor drum 222, performed after the laser beam scanner unit 227 is set in the digital color copying machine, a movable area of the cylinder mirror 245 in the parallel direction can be divided equally into both sides of the parallel direction.

Next, the following will specifically explain the structure and function for fine adjustment performed after the laser beam scanner unit 227 is installed in the digital color copying machine, i.e. the mechanism of the second adjustment means for fine adjustment in the parallel direction.

As shown in FIG. 1, the second plate opening section 15*b* is provided to the second plate 15. The second plate opening section 15*b* includes a touching surface TS which abuts to a back surface BS of the cylinder mirror 245 in the end part of the cylinder mirror 245 on the frame 12 side. Hereinafter, the part that abuts to the touching surface TS on the back surface BS of the cylinder mirror is particularly referred to as a standard surface SS.

The cylinder mirror 245 is inserted such that the standard surface SS abuts to the touching surface TS, whereby the cylinder mirror 245 can be hold by the second plate opening section 15*b* as a holding member.

The second plate opening section 15*b* is provided so as to make spacing at a side surface of the cylinder mirror 245 in the vertical direction, i.e. at both sides' end parts in the direction of the arrow A-B; and spaces 15*c*•15*c*. Consequently, while the standard surface SS of the cylinder mirror 245 is made abut to the touching surface TS of the second plate opening section 15*b*, the cylinder mirror 245 can be moved in the parallel direction with respect to the second plate 15. More specifically, even after the second plate 15 is fixed to the flame 12 and the first plate 14, only the cylinder mirror 245 can be moved in the parallel direction.

Further, on the second plate 15 provided is a female screw section 15*d* having a central axis in the parallel direction of the cylinder mirror 245, i.e. in the direction of the arrow A-B shown in FIG. 1. The female screw section 15*d* faces the second plate opening section 15*b*. Into the female screw section 15*d*, the setscrew 24 is screwed, and the setscrew 24 is provided so as to abut to the side surface in the vertical direction of the cylinder mirror 245.

By screwing and rotating the setscrew 24 with respect to the female screw section 15*d*, the setscrew 24 advances and retreats in the parallel direction to the female screw section 15*d*. This can move the cylinder mirror 245 in the parallel direction, i.e. in the direction of an arrow C-D shown in FIG. 1. Note that, commercially available screws such as a small screw or hexagon socket setscrew can be used for the setscrew 24.

Further, the hexagon shaft 25, which is a straight through shaft, is fitted to a hexagon socket 24*a* provided to the setscrew 24. The hexagon shaft 25 is adhered to the hexagon socket with an adhesive agent or the like used for preventing screws from loosening.

Figure 5:
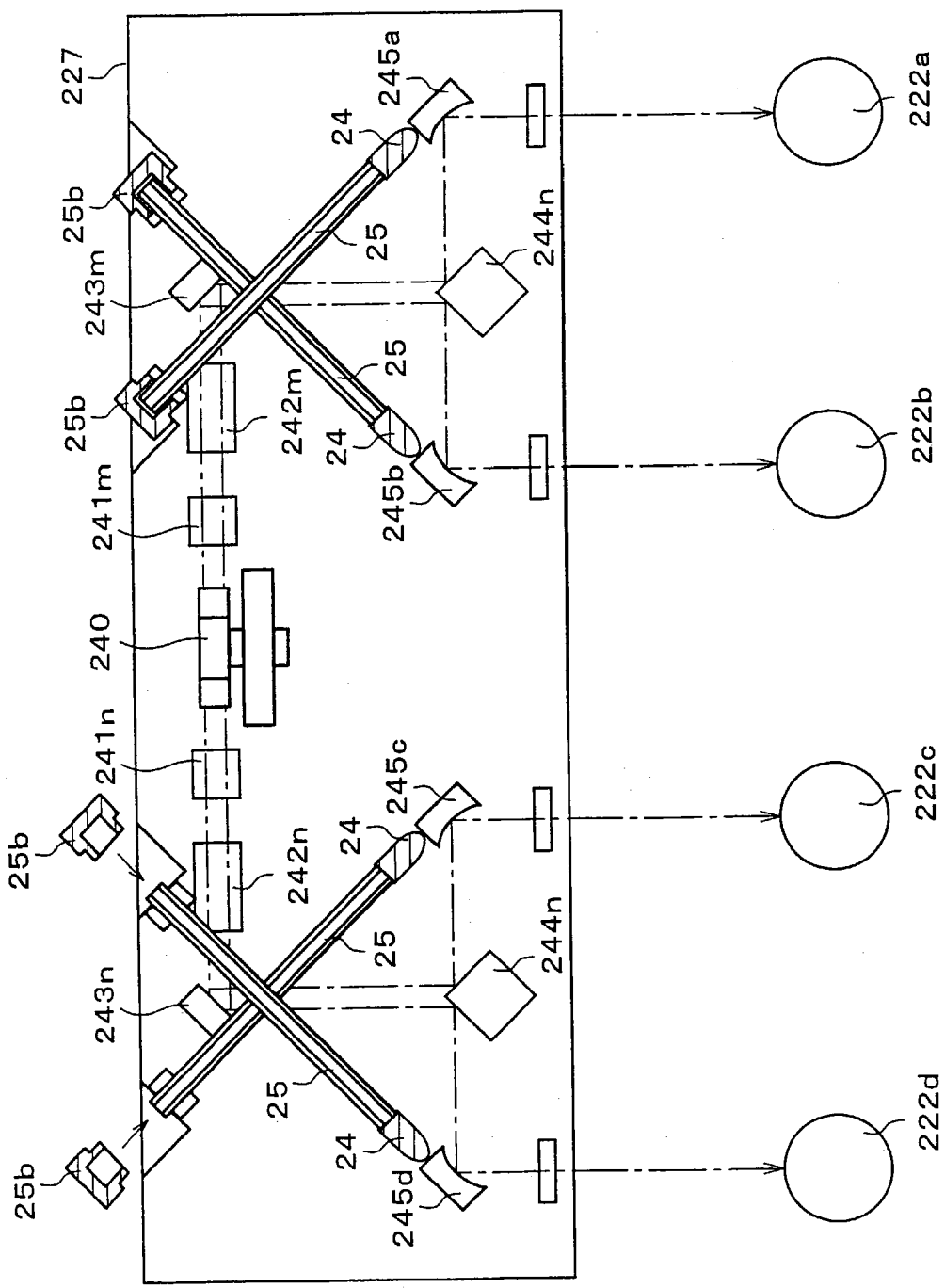
FIG. 5 is a block diagram showing the optical scanning arrangement with a polygon mirror.

Here, as shown in FIG. 5, it is preferable that the hexagon shaft 25 extends to the top of the laser beam scanner unit 227. More preferably, the hexagon shaft 25 extends to the direction different from the direction in which the photoconductor drum 222 is placed with respect to the laser beam scanner unit 227. With this arrangement, it is possible to adjust the cylinder mirror 245 from the upper side of the laser beam scanner unit 227.

Figure 6:
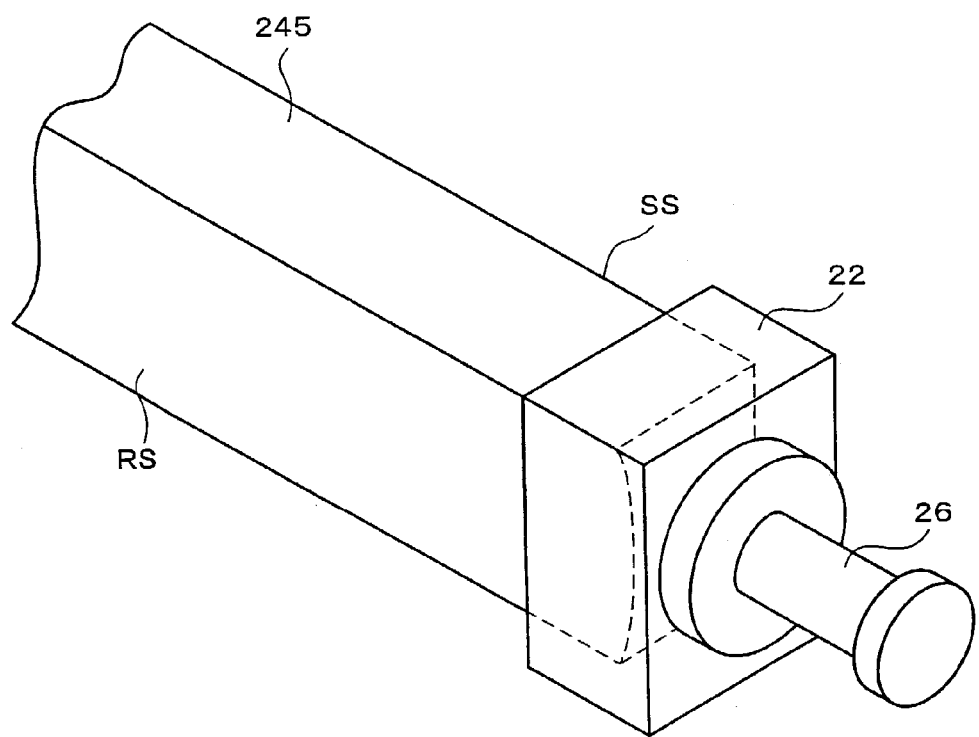
FIG. 6 is a partially perspective view of the cylinder mirror in the optical scanning arrangement.

Next, as shown in FIG. 6, the mirror cap 22, which is made of elastic material such as resin, is fitted to a part laterally projected from the second plate opening section 15*b* in the cylinder mirror 245 shown in FIG. 1. The mirror cap 22 is fixed to the cylinder mirror 245 with an adhesive agent. Moreover, the mirror cap 22 includes a cap side spring attaching section 26 as a attaching section.

Figure 7:
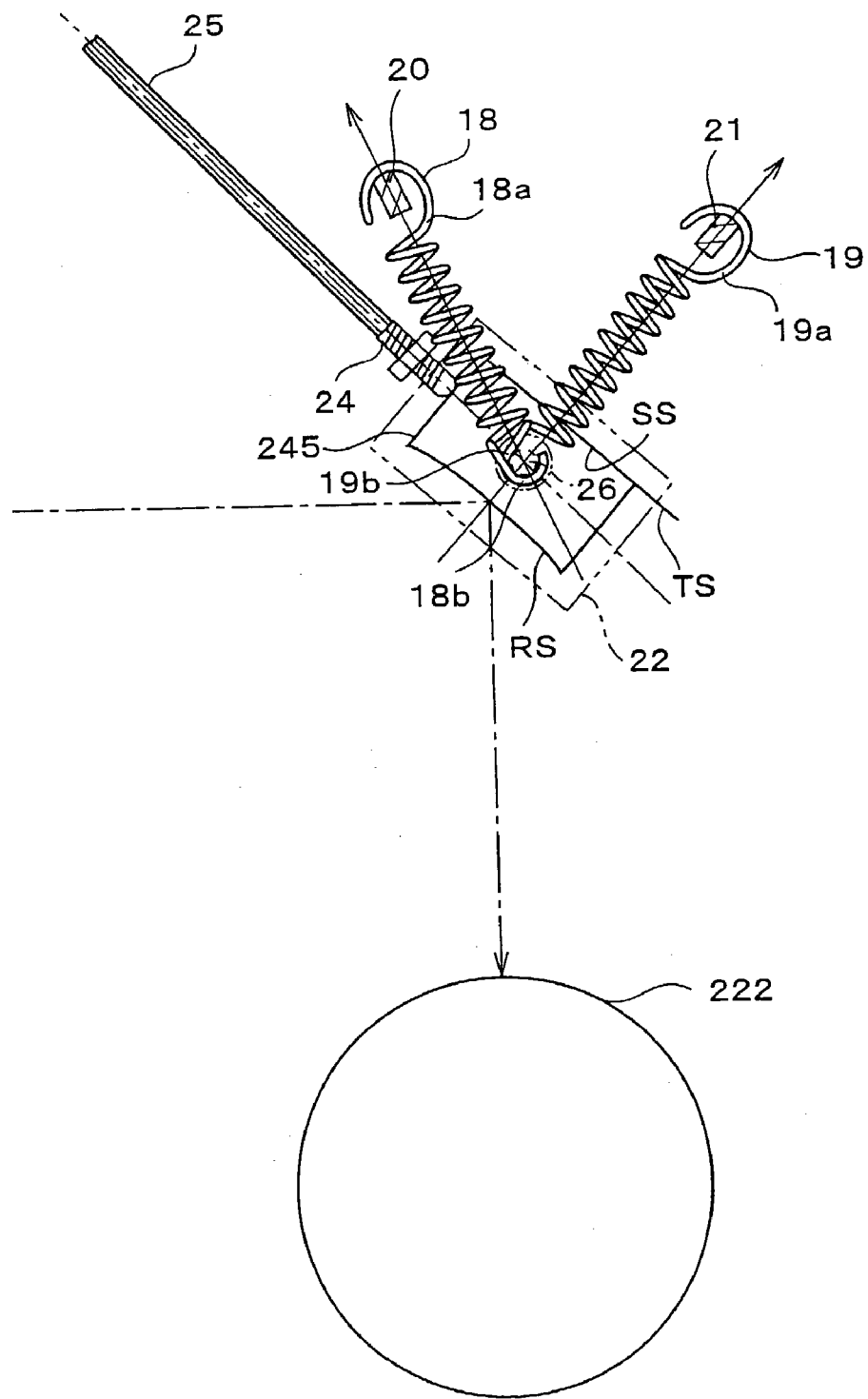
FIG. 7 is a block diagram showing the cylinder mirror, a first spring, a second elastic spring, a setscrew, a hexagon shaft, and a photoconductor drum in the optical scanning arrangement.

As shown in FIG. 7, the cap side spring attaching section 26 is provided at the position which is on the extended line in the direction of the setscrew 24's movement and which corresponds to substantially the center of a cross section of the cylinder mirror 245. Further, one ends of the first spring 18 and the second spring 19 are attached to the cap side spring attaching section 26. Still further, the other ends of the first spring 18 and the second spring 19, as shown in FIG. 1, is respectively attached to first and second spring mounting sections 20 and 21 which are provided to the second plate 15.

Here, as shown in FIG. 7, the second spring 19 is preferably provided in the substantially vertical direction with respect to the cap side spring attaching section 26, i.e. in the substantially vertical direction with respect to the touching surface TS from the substantially central position of the cylinder mirror 245. With this arrangement, it is possible to produce a tensility toward the back surface side of the cylinder mirror 245, and to reliably make the standard surface SS of the cylinder mirror 245 abut to the touching surface TS of the opening section.

Moreover, the first spring 18 is preferably provided in the substantially parallel direction with respect to the cap side spring attaching section 26, i.e. in the direction deviated from the straight line connecting the contact point on the cylinder mirror between the substantial center of the cylinder mirror 245 and the setscrew 24, and the substantial center of the cylinder mirror, toward the touching surface TS side of the opening section. With this arrangement, it is possible to produce a tensility toward the setscrew 24 side so as to make the mirror cap 22 abut to the setscrew 24. Consequently, it is possible to make the cylinder mirror 245 move in accordance with the movement of the setscrew 24.

Note that, the direction in the tensility of the first spring 18 is preferably set so as to incline slightly from the parallel direction toward the touching surface TS side. With this arrangement, as shown in FIG. 7, it is possible to prevent the cylinder mirror 245 from floating and to reliably make the standard surface SS abut to the touching surface TS.

Further, the first and second spring attaching sections and the cap side spring attaching section 26 are preferably is column-shaped. Still further, the first and second spring attaching sections 18a•19a in the respective first and second springs 18•19 and hook sections 18b•19b hooking on the cap side spring attaching section 26 are preferably arcuately shaped. With this arrangement, even if the directions of the first and second springs 18•19 are changed in adjusting the position of the cylinder mirror 245, it is possible to prevent unnecessary moment or others from being produced in each section.

By the second plate 15, the second plate opening section 15b, the setscrew 24, and the hexagon shaft 25 as the second adjustment means in the above arrangement, even after the laser beam scanner unit 227 is installed in the digital color copying machine as shown in FIG. 5, the hexagon shaft 25 is made rotated from the upper part of the laser beam scanner unit 227 to rotate the setscrew 24, so that it is possible to make the position of the cylinder mirror 245 move in the parallel direction. In this manner, the fine adjustment performed after the laser beam scanner unit 227 is installed in the digital color copying machine can be completed.

As described above, by adjusting the position of the cylinder mirror 245 by the cylinder mirror adjustment section 10, the first adjustment means and the second adjustment means can adjust the tilt of the laser beams' scanning directions with respect to the center line direction of the photoconductor drums 222 under the respective phases of the coarse adjustment and the fine adjustment. Therefore, the position of the cylinder mirror 245 is adjusted before and after the laser beam scanner unit 227 is installed to the digital color copying machine, whereby the image tilt caused by the tilt of the laser beams' scanning directions can be adjusted easily and precisely.

In the actual adjustment of images, predetermined test patterns including images formed by the photoconductor drums 222 are actually printed out, and the tilt can be adjusted by checking the things printed out.

Note that, in rotating the hexagon shaft 25, it is preferable that a designed tool having a hexagon socket is fitted to the hexagon shaft 25 to rotate the hexagon shaft 25. With this arrangement, removing the designed tool except for the time of adjustment can prevent the hexagon shaft 25 from accidentally rotating at the events such as maintenance.

Further, it is preferable that a bush 25b, which is made of elastic material such as resin and rubber, is attached to the top of the hexagon shaft 25 as shown in FIG. 5 except for the time of adjustment. With this arrangement, it is possible to prevent dusts from coming into the spacing between the hexagon shaft 25 and the laser beam scanner unit 227.

Thus, in the laser beam scanner unit 227 of the digital color copying machine in the present embodiment, before the laser beam scanner unit 227 is installed in the digital color copying machine, the first plate 14, the second plate 15, the first plate guide holes 16•16, and the second plate guide holes 17•17 cause the position of the cylinder mirror 245 to be moved linearly in the substantially vertical and parallel directions to an approximately plane surface, whereby the scanning position of the scanning beam reflected by the cylinder mirror 245 moves on the photoconductor drum 222. After the laser beam scanner unit 227 is installed in the digital color copying machine, the second plate opening section 15b, the setscrew 24, and the hexagon shaft 25 cause the position of the cylinder mirror 245 to be moved linearly in the substantially parallel direction to the approximately plane surface, whereby the scanning position of the scanning beam reflected by the cylinder mirror 245 moves on the photoconductor drum 222.

Therefore, before the laser beam scanner unit 227 is installed, the first plate 14, the second plate 15, the first plate guide holes 16•16, and the second plate guide holes 17•17 can adjust the position of the cylinder mirror 245 while checking the position of the scanning beam on the photoconductor drum 222, so that the coarse adjustment of the position of the scanning beam is possible to obtain an excellent image quality. Further, by installing the laser beam scanner unit 227 in the digital color copying machine, the second plate opening section 15b, the setscrew 24, and the hexagon shaft 25 cause the position of the curved mirror to be moved, whereby the fine adjustment can be performed for the positional deviation of the scanning beam caused on the photoconductor drum 222.

Especially, the movement direction of the position of the cylinder mirror 245 by the second plate opening section 15b, the setscrew 24, and the hexagon shaft 25 is the substantially parallel direction to the approximately plane surface of the reflective plane surface of the cylinder mirror 245, so that it is possible to minimize the scanning beam's influence on scanning properties and adjust the positional deviation of the scanning beam. Further, in the adjustment by the second plate opening section 15b, the setscrew 24, and the hexagon shaft 25, the movement in the substantially parallel direction alone can adjust the position of the cylinder mirror 245, so that it is not necessary to make the cylinder mirror 245 move in multi-directions, and easy adjustment is possible.

This can solve the problems such as a poor adjustment due to a poor adjustable range and a difficulty in adjustment due to necessity of long time for the adjustment.

After the laser beam scanner unit 227 is installed in the digital color copying machine, by making the cylinder mirror 245 move linearly only in the substantially parallel direction to the reflective surface RS, a power to the scanning property has a power to the tilt. However, it has little influence on other scanning properties, so that it is possible to adjust the tilt of the scanning line without having an influence to the scanning properties.

Note that, "a power to the scanning property has a power to the tilt" means that "to have an influence especially on the tilt of the scanning line among the scanning properties." More specifically, the tilt of the scanning line varies depending on an angle between the scanning line before being incident to the cylinder mirror 245 and a generating line of the cylinder mirror 245 inside the reflective surface RS of the cylinder mirror 245, so that a linear movement of the cylinder mirror 245 only in the substantially parallel direction with respect to the reflective surface RS can adjust the tilt of the scanning line.

As a result of this, it is possible to provide the laser beam scanner unit 227 of the digital color copying machine which can minimize the influence on scanning properties and adjust the scanning position of the scanning beam easily and quickly after the laser beam scanner unit 227 is installed in the digital color copying machine.

Further, in the laser beam scanner unit 227 of the digital color copying machine in the present embodiment, the standard surface SS of the cylinder mirror 245 is made slid along the touching surface TS of the second plate opening section 15b, thereby enabling to reliably move the cylinder mirror 245 linearly in the substantially parallel direction of the reflective surface RS. This makes it possible to adjust the scanning position of the scanning beam more precisely.

Still further, in the laser beam scanner unit 227 of the digital color copying machine in the present embodiment, the cylinder mirror 245 moves linearly in the substantially parallel direction of the reflective surface RS with the advance and retreat of the setscrew 24 in the substantially parallel direction by screwing and rotating. Therefore, the amount of the cylinder mirror 245's motion in the substantially parallel direction can be adjusted in accordance with the amount of setscrew 24 screwing and rotating, so that it is possible to adjust the position of the scanning beam precisely and slightly.

Yet further, in the laser beam scanner unit 227 of the digital color copying machine in the present embodiment, the cylinder mirror 245 is always applied a force toward the setscrew 24 by the first spring 18, and the setscrew 24 abuts to the cylinder mirror 245 more reliably. Therefore, it is possible to prevent the cylinder mirror 245 from floating with respect to the setscrew 24 and to make the cylinder mirror 245 move precisely in accordance with the amount of the setscrew 24's motion.

Further, in the laser beam scanner unit 227 of the digital color copying machine in the present embodiment, the second spring 19 applies a force to the cylinder mirror 245 toward the direction of the touching surface TS. Therefore, the cylinder mirror 245 reliably move linearly in the substantially parallel direction.

Still further, in the laser beam scanner unit 227 of the digital color copying machine in the present embodiment, the force, which is applied to the cylinder mirror 245 by the first spring 18 and the second spring 19, is applied to the cylinder mirror 245 via the mirror cap 22. Therefore, the mirror cap 22 serves as a cushion against the force by the first spring 18 and the second spring 19, so that it is possible to prevent the cylinder mirror 245 from being damaged by the force.

Yet further, in the laser beam scanner unit 227 of the digital color copying machine in the present embodiment, the setscrew 24 is made screwed and rotated from the outside of the laser beam scanner unit 227, and the position of cylinder mirror 245 is adjusted easily, thereby enabling to adjust the scanning position of the scanning beam. Further, commercially available, mass-produced screws at low price can be used for the setscrew 24, so that it is possible to realize reduction in cost of the whole digital color copying machine.

Further, in the laser beam scanner unit 227 of the digital color copying machine in the present embodiment, it is possible to adjust the positions of the scanning beams with respect to a plurality of scanning targets, by adjusting the position of each cylinder mirror 245.

As described above, an optical scanning arrangement of the present invention includes adjustment means for adjusting a scanning position of a scanning beam from optical scanning means, the adjustment means adjusting a position of a curved mirror for reflecting the scanning beam and guiding the scanning beam thus reflected to a scanning target, so as to adjust the scanning position of the scanning beam, and including first adjustment means for carrying out coarse adjustment in the position of the curved mirror and second adjustment means for carrying out fine adjustment in the position of the curved mirror, the first adjustment means moving the curved mirror linearly in substantially vertical and parallel directions with respect to an approximately plane surface of a part where the scanning beam can be incident in a reflective surface of the curved mirror, so as to carry out the coarse adjustment in the position of the curved mirror, the second adjustment means moving the curved mirror linearly only in a substantially parallel direction with respect to the approximately plane surface after the first adjustment means have completed the coarse adjustment, so as to carry out the fine adjustment in the position of the curved mirror.

Here, as a method of adjusting a mirror position considered are various methods for movement, such as a method of rotating a mirror body in a plane surface which is vertical to a reflective surface of the mirror, a method of making the mirror body to advance and retreat in the direction of incident light or reflected light, a method of moving the mirror body in the parallel direction to its reflective surface, or a method of moving the mirror body in the vertical direction to its reflective surface.

Inventors of the present invention have focused special attention on the method of moving the mirror body in the vertical direction to its reflective surface and the method of moving the mirror body in the parallel direction to its reflective surface and studied the influence on the scanning properties of the scanning beam with the movement of the mirror position.

As a result of extensive research, it has been proved that correction of the scanning tilt is possible by the above two methods; however, the method of moving in the parallel direction have a smaller influence on the scanning properties of the scanning beam than that of moving in the vertical direction.

Consequently, in view of the necessities of moving the mirror position only in a certain direction and minimizing the influence on images with the movement of the mirror position, a method of moving the mirror position in the parallel direction to adjust the mirror position is preferable in the adjustment performed after the optical scanning unit is installed in the main apparatus.

In the present invention, before the optical scanning arrangement is installed in the image forming device, the first adjustment means cause the position of the curved mirror to be moved linearly in the substantially vertical and parallel directions to the approximately plane surface, whereby the scanning position of the scanning beam reflected by the curved mirror moves on the scanning target. After the optical scanning arrangement is installed in the image forming device, the second adjustment means cause the position of the curved mirror to be moved linearly in the substantially parallel direction to the approximately plane surface, whereby the scanning position of the scanning beam reflected by the curved mirror moves on the scanning target.

Therefore, before the optical scanning arrangement is installed, the first adjustment means can adjust the position of the curved mirror while checking the position of the scanning beam on the scanning target, so that coarse adjustment of the position of the scanning beam is possible to obtain an excellent image quality. Further, by installing the optical scanning arrangement in the image forming device, the second adjustment means cause the position of the curved mirror to be moved, whereby fine adjustment can be performed for the positional deviation of the scanning beam caused on the scanning target.

Especially, the movement direction of the position of the curved mirror by the second adjustment means is the substantially parallel direction to the approximately plane surface of the reflective plane surface of the curved mirror, so that it is possible to minimize the scanning beam's influence on scanning properties and adjust the positional deviation of the scanning beam. Further, in the adjustment by the second adjustment means, the movement in the substantially parallel direction alone can adjust the position of the curved mirror, so that it is not necessary to make the curved mirror move in multi-directions, and easy adjustment is possible.

As a result of this, it is possible to provide an optical scanning arrangement which can minimize the influence on scanning properties and adjust the scanning position of the scanning beam easily and quickly after installing the optical scanning arrangement in the image forming device.

Further, the optical scanning arrangement of the present invention may be arranged so that the second adjustment means include a holding member for holding the curved mirror movably in the substantially parallel direction with respect to the reflective surface of the curved mirror, the curved mirror being provided with a standard surface, which is in parallel to a sliding direction, for sliding the curved mirror in the substantially parallel direction with respect to the reflective surface of the curved mirror, the holding member being provided with a touching surface for sliding the standard surface of the curved mirror in the substantially parallel direction with respect to the reflective surface of the curved mirror.

According to the above arrangement, the standard surface of the curved mirror is made slid along the touching surface of the holding member, thereby enabling to reliably move the curved mirror linearly in the substantially parallel direction of the reflective surface. This makes it possible to adjust the scanning position of the scanning beam more precisely.

Still further, the optical scanning arrangement of the present invention can be arranged so that the second adjustment means include a screw member for moving the curved mirror linearly in the substantially parallel direction with respect to the reflective surface of the curved mirror by screwing and rotating.

According to the above arrangement, the curved mirror moves linearly in the substantially parallel direction of the reflective surface with the advance and retreat of the screw member in the substantially parallel direction by screwing and rotating. Therefore, the amount of the curved mirror's motion in the substantially parallel direction can be adjusted in accordance with the amount of the screw member screwing and rotating, so that it is possible to adjust the position of the scanning beam precisely and slightly.

Yet further, the optical scanning arrangement of the present invention can be arranged so that a first elastic member is included for applying a force to the curved mirror to provide a tensility in an axial direction of the screw member.

According to the above arrangement, the curved mirror is always applied a force toward the screw member by the first elastic member, and the screw member abuts to the curved mirror more reliably. Therefore, it is possible to prevent the curved mirror from floating with respect to the screw member and to make the curved mirror move precisely in accordance with the amount of the screw member's motion.

Further, the optical scanning arrangement of the present invention can be arranged so that a direction in which the first elastic member applies a force is a direction deviated from a straight line connecting a contact point between the screw member and the curved mirror and a substantial center of the curved mirror to a touching surface side of the holding member.

Therefore, it is possible to apply a force to the curved mirror with respect to the screw member without producing a force in the opposite direction to the force of the first elastic member. Consequently, it is possible to maintain the state where the curved mirror is made contact with the touching surface of the holding member with pressure, thereby enabling to adjust the position of the curved mirror with the screw member more precisely.

Still further, the optical scanning arrangement of the present invention can be arranged so that a second elastic member is included for applying a force to the curved mirror toward the touching surface of the holding member.

According to the above arrangement, the second elastic member applies a force to the curved mirror toward the direction of the touching surface of the holding member. Therefore, the curved mirror reliably move linearly in the substantially parallel direction.

Yet further, the optical scanning arrangement of the present invention can be arranged so that a direction in which the second elastic member applies a force is a direction which is substantially vertical with respect to the touching surface of the holding member.

Therefore, the curved mirror is always applied a force toward the touching surface of the holding member by the second elastic member. Consequently, it is possible to prevent the curved mirror from floating from the holding member and to stably make the curved mirror move linearly in the substantially parallel direction to the reflective surface of the curved mirror. Moreover, it is possible to stably and effectively apply the force to a large area where the curved mirror and the touching surface contacts with each other.

Further, the optical scanning arrangement of the present invention can be arranged so that a mirror cap covers a side end part of the curved mirror so as to fit to the side end part of the curved mirror, and the first elastic member and the second elastic member are attached to the mirror cap.

According to the above arrangement, the force, which is applied to the curved mirror by the first elastic member and the second elastic member, is applied to the curved mirror via the mirror cap. Therefore, the mirror cap serves as a cushion against the force by the first elastic member and the second elastic member, so that it is possible to prevent the curved mirror from being damaged by the force of the elastic members.

Still further, the optical scanning arrangement of the present invention can be arranged so that each of the first elastic member and the second elastic member include a hook section in each end part, and the mirror cap includes an attaching section for attaching the hook sections of the first elastic member and the second elastic member.

Therefore, the force by the first elastic member and the second elastic member is simultaneously given to the curved mirror. Consequently, the curved mirror can be applied a force in the both directions of the screw member and the touching surface, thereby enabling to reliably move in the substantially parallel direction.

Yet further, the optical scanning arrangement of the present invention can be arranged so that an axis member is included for causing the screw member to extend to a position at which the axis member is bare outside the optical scanning arrangement.

According to the above arrangement, the screw member is made screwed and rotated from the outside of the optical scanning arrangement, and the position of the curved mirror is adjusted easily, thereby enabling to adjust the scanning position of the scanning beam. Further, commercially available, mass-produced screws at low price can be used for the screw member, so that it is possible to realize reduction in cost of the whole optical arrangement.

Further, the optical scanning arrangement of the present invention can be arranged so that the position at which the axis member is bare is provided in a direction different from a direction in which the scanning target is positioned with respect to the optical scanning arrangement.

According to the above arrangement, it is possible to secure a space for performing the adjustment operation of the axis member by an adjustment tool, thereby improving the ease of maintenance of the optical scanning arrangement.

Still further, the optical scanning arrangement of the present invention can be arranged so that optical deflecting means are provided for guiding the scanning beam from the optical scanning means to the curved mirror, the optical deflecting means guiding a plurality of the scanning beam onto the curved mirror provided in different direction to scan and expose a plurality of the scanning target.

According to the above arrangement, it is possible to adjust the positions of the scanning beams with respect to a plurality of scanning targets, by adjusting the position of each curved mirror.

Yet further, in the optical scanning arrangement of the present invention which includes a curved mirror for reflecting a scanning beam from optical scanning means and guiding the scanning beam thus reflected to a scanning target, it can be arranged so as to include:

first adjustment means for moving the curved mirror linearly in substantially vertical and parallel directions with respect to an approximately plane surface of a part where the scanning beam can be incident in a reflective surface of the curved mirror; and second adjustment means for moving the curved mirror linearly only in a substantially parallel direction with respect to the approximately plane surface after the first adjustment means have completed its adjustment.

Further, in the image forming device of the present invention including an optical scanning arrangement which guides a scanning beam from optical scanning means to a scanning target, the optical scanning arrangement includes adjustment means for adjusting a position of a curved mirror for reflecting the scanning beam and guiding the scanning beam thus reflected to the scanning target, so as to adjust the scanning position of the scanning beam, the adjustment means including first adjustment means for carrying out coarse adjustment in the position of the curved mirror and second adjustment means for carrying out fine adjustment in the position of the curved mirror, the first adjustment means moving the curved mirror linearly in substantially vertical and parallel directions with respect to an approximately plane surface of a part where the scanning beam can be incident in a reflective surface of the curved mirror, so as to carry out the coarse adjustment in the position of the curved mirror, the second adjustment means moving the curved mirror linearly only in a substantially parallel direction with respect to the approximately plane surface after the first adjustment means have completed the coarse adjustment, so as to carry out the fine adjustment in the position of the curved mirror.

According to the above invention, by the second adjustment means performing the fine adjustment in which the mirror position is caused to move in the substantially parallel direction, the positional deviation of the scanning beam caused after the optical scanning arrangement is installed in the image forming device is adjusted easily while minimizing the influence on the scanning properties, thereby enabling to obtain excellent images.

Note that, in the optical scanning arrangement of the present invention, the first elastic member is preferably a tension spring.

According to the above arrangement, even when the position of the curved mirror moves to the position which is different from the direction of the screw member, the tension spring contracts to apply a force to the curved mirror again in the direction of the screw member. Consequently, it is possible to apply the force of the first elastic member to the curved mirror constantly in a stable condition.

Note that, in the optical scanning arrangement of the present invention, the second elastic member is preferably a tension spring.

According to the above arrangement, even when the position of the curved mirror moves to the position which is different from the direction of the touching surface of the holding member, the tension spring contracts to apply a force to the curved mirror again in the direction of the touching surface. Consequently, it is possible to apply the force of the second elastic member to the curved mirror constantly in a stable condition.

Further, in the optical scanning arrangement of the present invention, it is preferable that the hook section of the elastic members is circular.

According to the above arrangement, with the movement of the curved mirror, the hook sections of the elastic members can rotate smoothly. Consequently, it is possible to apply the force of the elastic members to the curved mirror constantly in a stable condition.

Still further, in the optical scanning arrangement of the present invention, it is preferable that the screw member is a screw having a hexagon socket and that the axis member is a hexagon shaft which is fitted to the hexagon socket of the screw member.

According to the above arrangement, the screw having a hexagon socket, which is commercially available and at a low price, can be used for the screw member, and the axis member is easily fitted to the hexagon socket of the screw member so that the screw member can be reliably screwed and rotated. Moreover, the amount of the screw member screwing and rotating is adjusted easily by using a tool such as a commercially available hexagon wrench, thereby enabling to adjust the scanning position of the scanning beam.

Yet further, in the optical scanning arrangement of the present invention, it is preferable that the screw member and the axis member are bonded together with adhesive agent.

According to the above arrangement, the screw member and the axis member are reliably fitted to each other. Consequently, it is possible to prevent the screw member and the axis member from being separated each other due to vibration, resulting in the impossibility of the arrangement in the position of the scanning beam.

Further, in the optical scanning arrangement of the present invention, it is preferable that the position where the axis member is bare is at the upper side of the optical scanning arrangement in case when the optical scanning arrangement is set in the image forming device.

According to the above arrangement, the amount of the screw member screwing and rotating can be easily adjusted via the axis member from the part where the axis member is bare at the upper part of the main apparatus.

Still further, in the optical scanning arrangement of the present invention, it is preferable that a bush is included for removably sealing the part where the axis member is bare.

According to the above arrangement, it is possible to prevent the user from accidentally touching the adjustment screw from the part where the axis member is bare, and to prevent dusts from coming into the optical scanning arrangement from the spacing of the bare part.

Yet further, in the optical scanning arrangement of the present invention, it is preferable that the adjustment means are provided at least on one side of the curved mirror.

According to the above arrangement, providing the adjustment means on one side of the curved mirror alone has a sufficient efficiency in adjustment, and it is possible to reduce the cost required for the adjustment means.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

INDUSTRIAL APPLICATION OF THE PRESENT INVENTION

As described above, the optical scanning arrangement of the present invention is suitable for the use for adjusting the scanning positions of the scanning beams which scan and record images on the photoconductors in the image forming device such as printer, copying machine, and facsimile apparatus. Especially, it is suitable for adjusting the scanning position of the scanning beam after the optical scanning arrangement is installed in the image forming device.

What is claimed is:

1. An optical scanning arrangement including adjustment means for adjusting a scanning position of a scanning beam from optical scanning means,
    the adjustment means adjusting a position of a curved mirror for reflecting the scanning beam and guiding the scanning beam thus reflected to a scanning target, so as to adjust the scanning position of the scanning beam, and including first adjustment means for carrying out coarse adjustment in the position of the curved mirror and second adjustment means for carrying out fine adjustment in the position of the curved mirror,
    the first adjustment means moving the curved mirror linearly in substantially vertical and parallel directions with respect to an approximately plane surface of a part where the scanning beam can be incident in a reflective surface of the curved mirror, so as to carry out the coarse adjustment in the position of the curved mirror,
    the second adjustment means moving the curved mirror linearly only in a substantially parallel direction with respect to the approximately plane surface after the first adjustment means have completed the coarse adjustment, so as to carry out the fine adjustment in the position of the curved mirror.

2. The optical scanning arrangement according to claim 1, wherein the second adjustment means include a holding member for holding the curved mirror movably in the substantially parallel direction with respect to the reflective surface of the curved mirror,
    the curved mirror being provided with a standard surface, which is in parallel to a sliding direction, for sliding the curved mirror in the substantially parallel direction with respect to the reflective surface of the curved mirror,
    the holding member being provided with a touching surface for sliding the standard surface of the curved mirror along the substantially parallel direction with respect to the reflective surface of the curved mirror.

3. The optical scanning arrangement according to claim 1 or 2, wherein the second adjustment means include a screw member for moving the curved mirror linearly in the substantially parallel direction with respect to the reflective surface of the curved mirror by screwing and rotating.

4. The optical scanning arrangement according to claim 3, wherein a first elastic member is included for applying a force to the curved mirror to provide a tensility in an axial direction of the screw member.

5. The optical scanning arrangement according to claim 4, wherein a direction in which the first elastic member applies a force is a direction deviated from a straight line connecting a contact point between the screw member and the curved mirror and a substantial center of the curved mirror to a touching surface side of the holding member.

6. The optical scanning arrangement according to any one of claims 2 to 5, wherein a second elastic member is included for applying a force to the curved mirror toward the touching surface of the holding member.

7. The optical scanning arrangement according to claim 6, wherein a direction in which the second elastic member applies a force is a direction which is substantially vertical with respect to the touching surface of the holding member.

8. The optical scanning arrangement according to claim 6 or 7, wherein a mirror cap covers a side end part of the curved mirror so as to fit to the side end part of the curved mirror, and
    the first elastic member and the second elastic member are attached to the mirror cap.

9. The optical scanning arrangement according to claim 8, wherein each of the first elastic member and the second elastic member include a hook section in each end part, and
    the mirror cap includes an attaching section for attaching the hook sections of the first elastic member and the second elastic member.

10. The optical scanning arrangement according to any one of claims 3 to 9, wherein an axis member is included for causing the screw member to extend to a position at which the axis member is bare outside the optical scanning arrangement.

11. The optical scanning arrangement according to claim 10, wherein the position at which the axis member is bare is provided in a direction different from a direction in which the scanning target is positioned with respect to the optical scanning arrangement.

12. The optical scanning arrangement according to any one of claims 1 to 11, wherein optical deflecting means are provided for guiding the scanning beam from the optical scanning means to the curved mirror, the optical deflecting means guiding a plurality of the scanning beam onto the curved mirror provided in different direction to scan and expose a plurality of the scanning target.

13. An optical scanning arrangement which includes a curved mirror for reflecting a scanning beam from optical scanning means and guiding the scanning beam thus reflected to a scanning target, the optical scanning arrangement comprising:

first adjustment means for moving the curved mirror linearly in substantially vertical and parallel directions with respect to an approximately plane surface of a part where the scanning beam can be incident in a reflective surface of the curved mirror; and second adjustment means for moving the curved mirror linearly only in a substantially parallel direction with respect to the approximately plane surface after the first adjustment means have completed its adjustment.

14. An image forming device including an optical scanning arrangement which guides a scanning beam from optical scanning means to a scanning target, the optical scanning arrangement including adjustment means for adjusting a position of a curved mirror for reflecting the scanning beam and guiding the scanning beam thus reflected to the scanning target, so as to adjust the scanning position of the scanning beam, the adjustment means including first adjustment means for carrying out coarse adjustment in the position of the curved mirror and second adjustment means for carrying out fine adjustment in the position of the curved mirror, the first adjustment means moving the curved mirror linearly in substantially vertical and parallel directions with respect to an approximately plane surface of a part where the scanning beam can be incident in a reflective surface of the curved mirror, so as to carry out the coarse adjustment in the position of the curved mirror, the second adjustment means moving the curved mirror linearly only in a substantially parallel direction with respect to the approximately plane surface after the first adjustment means have completed the coarse adjustment, so as to carry out the fine adjustment in the position of the curved mirror.

* * * * *

UNITED STATES PATENT AND TRADEMARK OFFICE
CERTIFICATE OF CORRECTION

| | | |
|---|---|---|
| PATENT NO. | : 7,212,324 B2 | Page 1 of 1 |
| APPLICATION NO. | : 10/297194 | |
| DATED | : May 1, 2007 | |
| INVENTOR(S) | : Toshio Yamanaka et al. | |

It is certified that error appears in the above-identified patent and that said Letters Patent is hereby corrected as shown below:

Title Page, Item (30) should be added as follows:

FOREIGN APPLICATION PRIORITY DATA

December 5, 2000  (JP). . . . . . . . . . . . . . . . . .2000-370673

Signed and Sealed this

Twenty-first Day of August, 2007

JON W. DUDAS
*Director of the United States Patent and Trademark Office*